(12) United States Patent
Kawasaki et al.

(10) Patent No.: US 7,355,137 B2
(45) Date of Patent: Apr. 8, 2008

(54) WATERPROOF STRUCTURE OF PUSH BUTTON SWITCH

(75) Inventors: Yasuhiko Kawasaki, Fussa (JP); Shigeru Kato, Ome (JP); Tohru Tanigawa, Tokorozawa (JP)

(73) Assignee: Casio Hitachi Mobile Communications Co., Ltd., Tokyo (JP)

( * ) Notice: Subject to any disclaimer, the term of this patent is extended or adjusted under 35 U.S.C. 154(b) by 0 days.

(21) Appl. No.: 11/446,938

(22) Filed: Jun. 5, 2006

(65) Prior Publication Data

US 2007/0034493 A1  Feb. 15, 2007

(30) Foreign Application Priority Data

Jun. 9, 2005 (JP) ............... 2005-170168

(51) Int. Cl.
*H01H 13/06* (2006.01)
(52) U.S. Cl. ................. 200/302.2; 200/302.1
(58) Field of Classification Search ............ 200/302.2, 200/302.1, 302.3
See application file for complete search history.

(56) References Cited

U.S. PATENT DOCUMENTS 4,170,104 A * 10/1979 Yamagata ............ 368/289
4,218,602 A * 8/1980 Creech ............... 200/302.3
4,861,950 A * 8/1989 Yanai et al. ........... 200/5 R
5,258,592 A * 11/1993 Nishikawa et al. ...... 200/302.3
5,603,400 A * 2/1997 Goto et al. ........... 200/302.3

FOREIGN PATENT DOCUMENTS

JP  2001-222927  8/2001

* cited by examiner

*Primary Examiner*—Elvin Enad
*Assistant Examiner*—Lheiren Mae A. Anglo
(74) *Attorney, Agent, or Firm*—Cohen Pontani Lieberman & Pavane LLP (57) ABSTRACT

A waterproof structure with a simple structure and a good assemble workability is provided. A recess portion is formed on a side of an inner casing, and a through hole is formed at the bottom of the recess portion. The through hole runs to a housing recess portion, and a dome switch opposes to the through hole in the inner casing. A protrusion of a cup member is inserted into the through hole from the outside of the inner casing. A protrusive portion protruding from the bottom surface of a push button is inserted into the opening of the cup member. A rubber sheet which couples the push button is sandwiched between the inner casing and a top cover and a back cover.

9 Claims, 5 Drawing Sheets

WATERPROOF STRUCTURE OF PUSH BUTTON SWITCH

BACKGROUND OF THE INVENTION

1. Field of the Invention

The present invention relates to a waterproof structure of a push button which is provided on electronic devices.

2. Description of the Related Art

Electronic devices are provided with push buttons, and enables inputs of characters and numbers and various instruction inputs by pressing a switch with push buttons. For an electronic device like a portable electric device, such as a cellular phone or a portable radio, various waterproof structures are proposed for preventing entering of water from a clearance between the push button and a casing. For example, Unexamined Japanese Patent Application KOKAI Publication No. 2001-222927 discloses a waterproof structure of a switch device which mounts a flexible substrate provided with a tact switch on the outer surface of a casing, and covers the flexible substrate by a waterproof member provided with a button section. The waterproof member is fixed by a fixation member having an opening corresponding to the button section, and the button section which protrudes from the opening of the fixation member is covered by a press-to-talk type button over the fixation member. Further, the fixation member is fixed by a top cover.

In this manner, the conventional waterproof structure of the switch device employs a complex structure. According to the conventional waterproof structure, because the tact switch and the flexible substrate are mounted on the outer surface of the casing, it is necessary to lead a part of wirings of the flexible substrate into the casing, so that the efficiency of an assemble work is not good.

SUMMARY OF THE INVENTION

The present invention has been made in view of the aforementioned circumstance, and it is an object of the invention to provide a waterproof structure of a push button switch with a simple structure and a good assemble workability.

To achieve the object, a waterproof structure of a push button switch comprises a casing inside which a press type switch is provided, and which is formed with a through hole at a position where the press type switch opposes to, a packing which includes an elastic member inserted into the through hole in such a way that an aperture portion is located outside the casing, and a cylindrical holder having cylindrical portion fit into the aperture portion, a push button formed with a protrusive portion inserted into the aperture portion of the elastic member, and which can press the press type switch via the elastic member.

The elastic member may cover the cylindrical holder from an open end at the elastic member side of the cylindrical holder to a region in an outer circumference surface of the cylindrical holder which overlaps at least the through hole.

The elastic member may have a convex portion which is formed around entire outer circumference surface of the elastic member, and which is compressed and deformed by fitting the elastic member into the through hole.

The elastic member may have a flange portion which is stopped by an outer surface of the casing.

The cylindrical holder may have a flange portion which is stopped by an outer surface of the casing.

The casing may have a recess portion formed around the through hole, and the flange portion of the cylindrical holder is fitted into the recess portion.

The waterproof structure of a push button switch may further comprise a pair of covers covering the casing and each having a notch portion, and a piece of elastic sheet provided with the push button, wherein the elastic sheet is sandwiched between the casing and the pair of covers in such a way that the push button is exposed from the notch portions.

According to the invention, a simple structure that the elastic member is fitted into the through hole enhances the watertightness of the through hole.

DETAILED DESCRIPTION OF THE PREFERRED EMBODIMENT

The best mode for carrying out the invention will be explained with reference to the accompanying drawings. In the following embodiment, various preferable technical limitations are set for carrying out the invention, but the scope of the invention shall not be limited to the following embodiment and illustrated examples.

Figure 1:
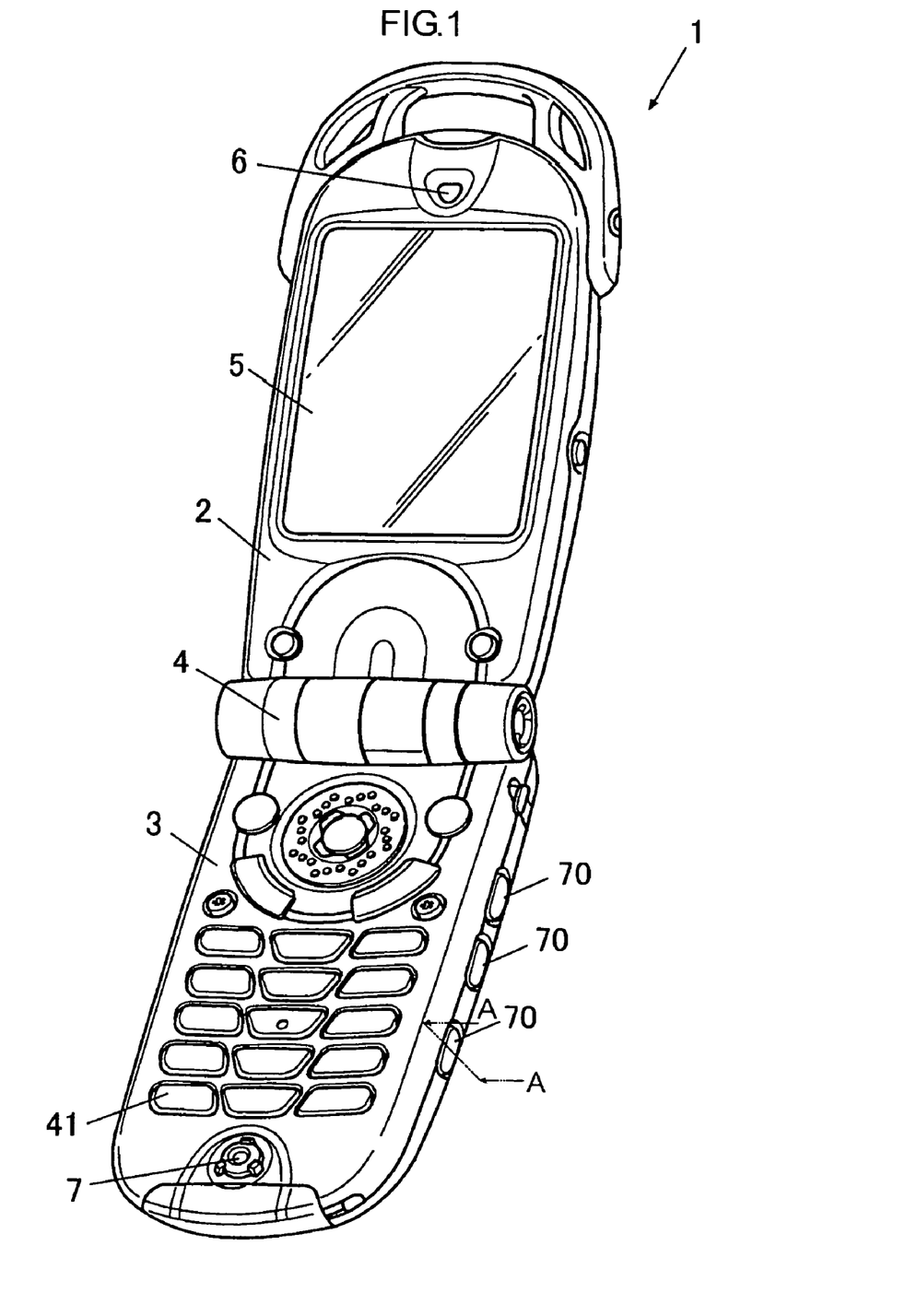
FIG. 1 is a perspective view illustrating a cellular phone employing a waterproof structure of a push switch according to an embodiment of the invention.

FIG. 1 is a perspective view illustrating a cellular phone 1 to which a waterproof structure of a push button switch of the invention is applied.

In the cellular phone 1, an upper housing 2 is jointed to a lower housing 3 by a hinge 4, and is rotatable around the axis of the hinge 4 with respect to the lower housing 3. With the upper housing 2 closed with respect to the lower housing 3, the front face of the upper housing 2 opposes to the front face of the lower housing 3, and with the upper housing 2 opened with respect to the lower housing 3, both of the front faces of the upper and lower housings 2, 3 face the front side.

The front face of the upper housing 2 is provided with a display section 5 having a liquid crystal display panel or an electroluminescence display panel, and a speaker 6 for communication. The front face of the lower housing 3 is provided with a plurality of convex keys 41 and a microphone 7 for communication, and three push button switches (to be more precise, push buttons 70 each constituting a part of a push button switch) are provided on a right side face of the lower housing 3 in FIG. 1.

Figure 2:
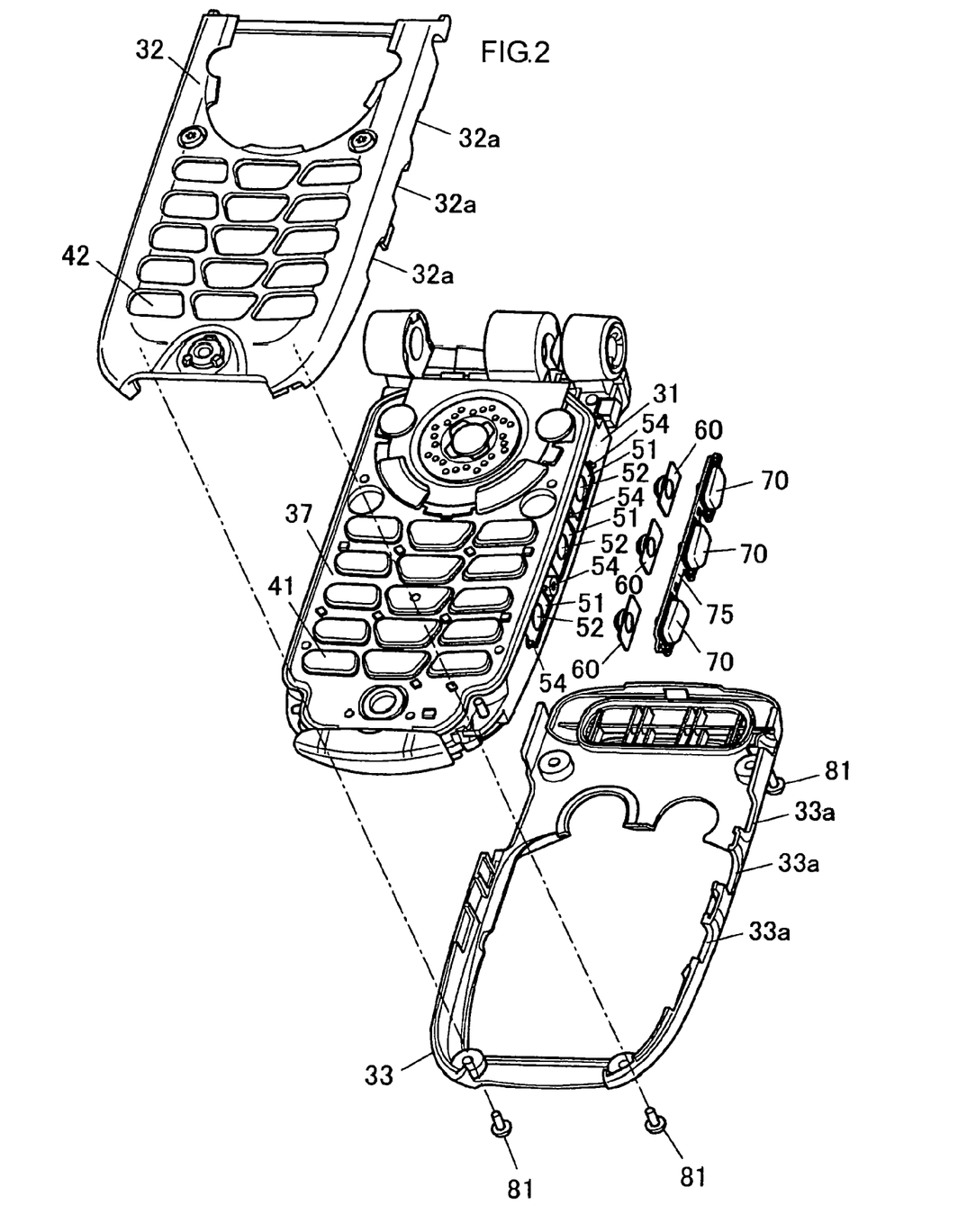
FIG. 2 is an exploded perspective view illustrating a back casing of the cellular phone illustrated in FIG. 1.
Figure 3:
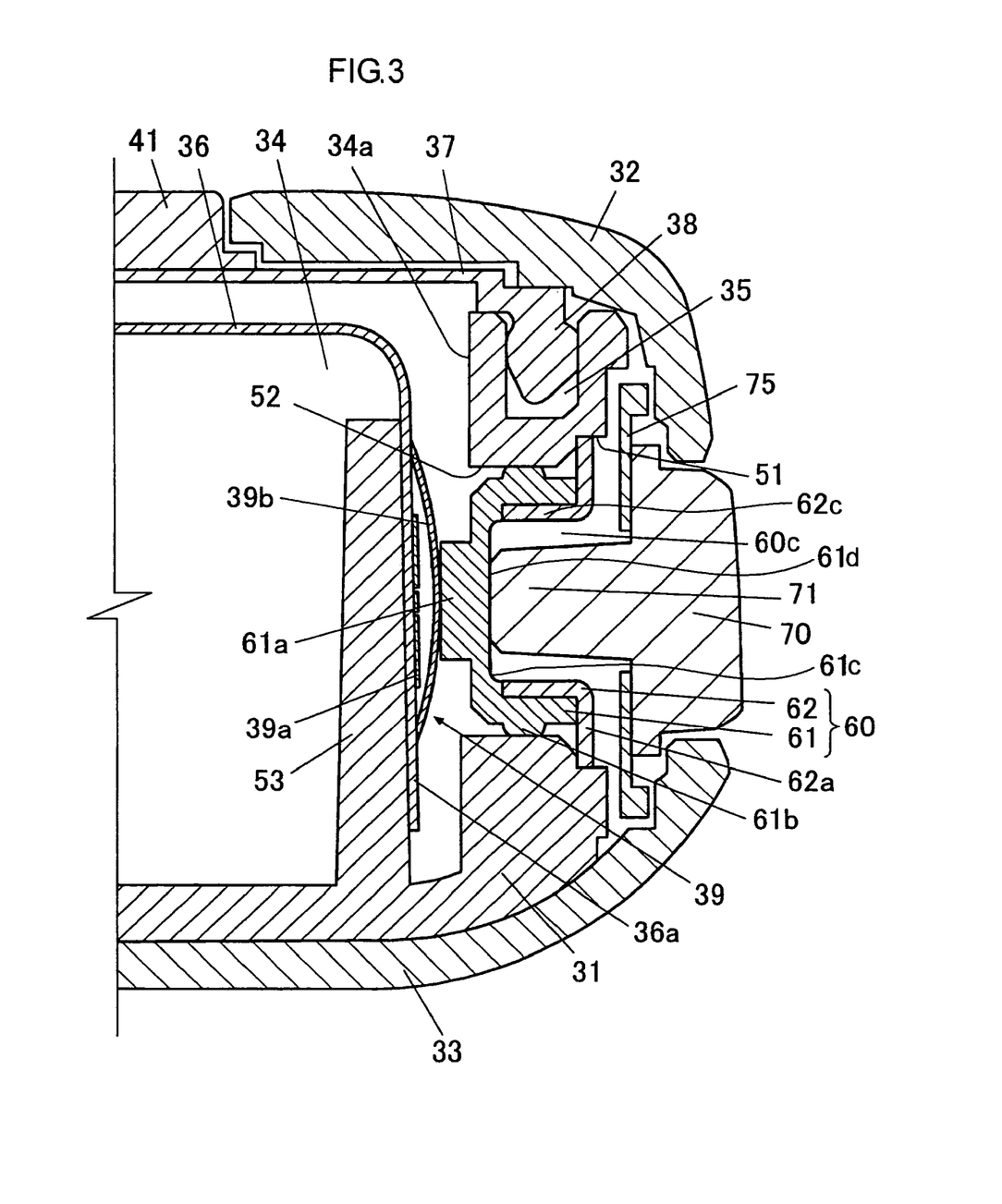
FIG. 3 is a partial cross-sectional view along a line A-A in FIG. 1.

Next, the lower housing 3 will be explained in detail with reference to FIGS. 2 and 3. FIG. 2 is an exploded perspective view illustrating the lower housing 3, and FIG. 3 is a partial cross-sectional view of the lower housing 3 along a line A-A in FIG. 1.

As illustrated in FIG. 2, the lower housing 3 comprises an inner casing 31, a top cover (top casing) 32 which covers the front side of the inner casing 31, and a back cover (back casing) 33 which covers the rear side of the inner casing 31. As illustrated in FIG. 3, the front face side of the inner casing 31 is concaved in such a manner as to form a housing recess portion 34, and a groove 35 is formed across the entire edge of the housing recess portion 34. That is, the housing recess portion 34 is surrounded by the groove 35.

A circuit board (not illustrated), a key FPC (Flexible Printed Circuit) 36 and the like are housed in the housing recess portion 34. The key FPC 36 is housed in such a manner as to cover the circuit board, and electrically connected to the circuit board.

The housing recess portion 34 housing the key FPC 36 is covered by a piece of key sheet member 37 which is made of an elastic material like a rubber. That is, a convex rib 38 is formed on the back face of the key sheet member 37 across the entire outer edge, and fitted into the groove 35 which surrounds the housing recess portion 34.

As illustrated in FIG. 2, the plurality of convex keys 41 are formed on the front face of the key sheet member 37. Thin switches (not illustrated) like dome switches corresponding to respective convex keys 41 are provided on the key FPC 36.

The top cover 32 is formed with a plurality of key openings 42. With the top cover 32 fitted into the front face side of the inner casing 31, each convex key 41 is inserted into each key opening 42, and the outer edge of the key sheet member 37 is sandwiched between the top cover 32 and the inner casing 31.

Next, the waterproof structure of the push button switch will be explained.

As illustrated in FIG. 2, three rectangular recess portions 51 are formed on the right side face of the inner casing 31. As illustrated in FIG. 3, a through hole 52 is formed in the bottom of each recess portion 51 and runs to the housing recess portion 34. A rib 53 is protrudingly provided on the bottom of each housing recess portion 34. The ribs 53 are arranged at predetermined intervals from an inner wall surface 34a of the right side (in FIG. 2) of the housing recess portion 34 in such a way as to face the inner wall surface 34a.

The right side (in FIG. 2) end portion of the key FPC 36 is vented, and a vented portion 36a of the key FPC 36 is inserted between the rib 53 and the inner wall surface 34a of the housing recess portion 34.

The vented portion 36a of the key FPC 36 is provided with thin switches employing the same structure as the main body portion, e.g., dome switches 39 corresponding to the respective through holes 52. That is, the dome switches 39 are arranged in such a manner as to oppose the respective through holes 52.

The dome switch 39 is one that a fixed contact 39a patterned on the key FPC 36 is covered by a metal plate or a metal film 39b as a moving contact 39b in a dome like shape. Other thin switches, such as a tactile switch and a membrane switch, may be used instead of the dome switch 39, and other press type switch may also be used.

As illustrated in FIG. 3, the through hole 52 is sealed by a packing member 60. The packing member 60 comprises a bowl like cup member 61 made of a rubber elastic material like a silicon rubber, and a metallic or hard resin made cylindrical holder 62 which holds the cup member 61. A flange portion 62a is formed on one open end side of the cylindrical holder 62.

Figure 4:
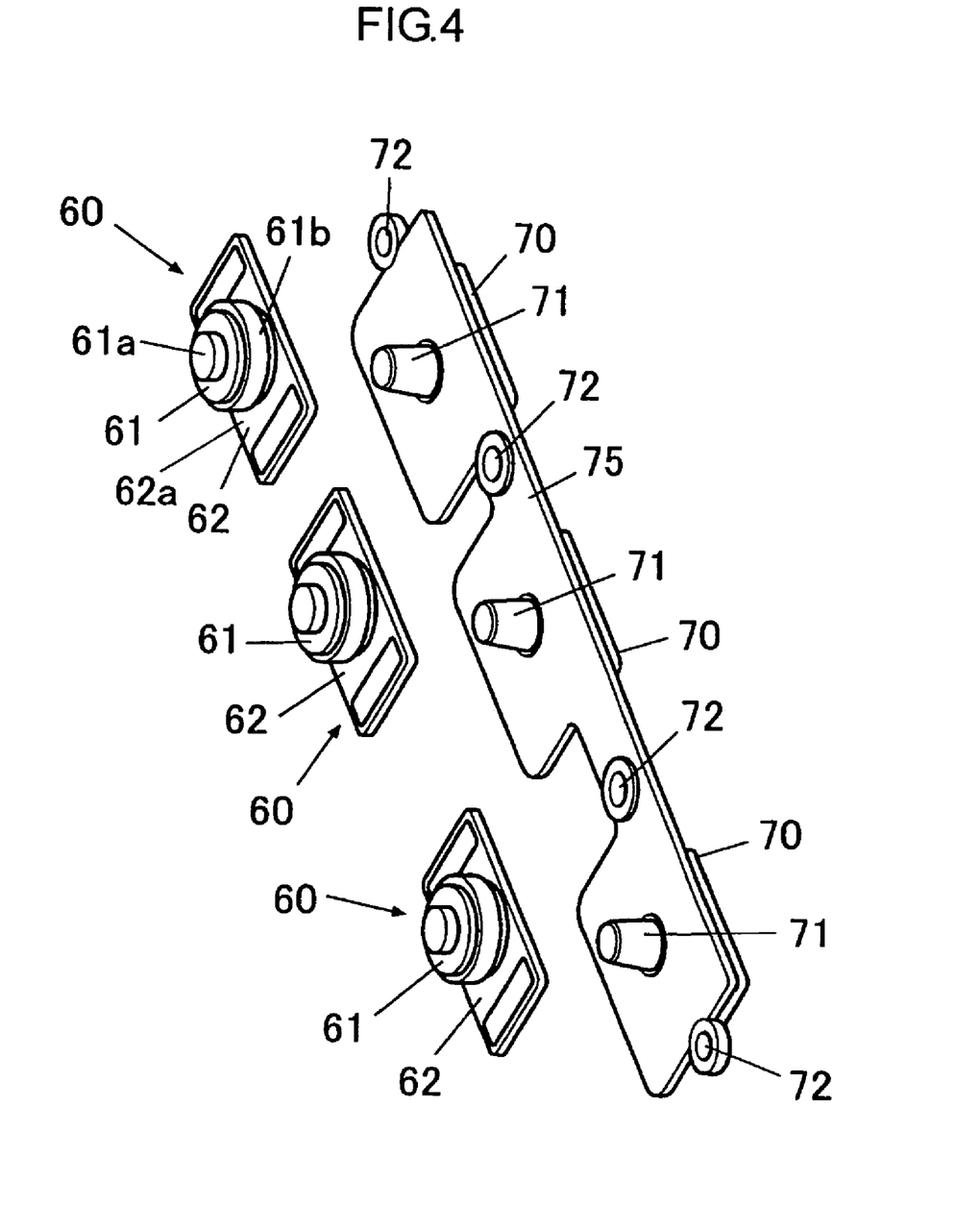
FIG. 4 is a perspective view illustrating push buttons, a piece of rubber sheet, and packing members of the back casing illustrated in FIG. 2.
Figure 5:
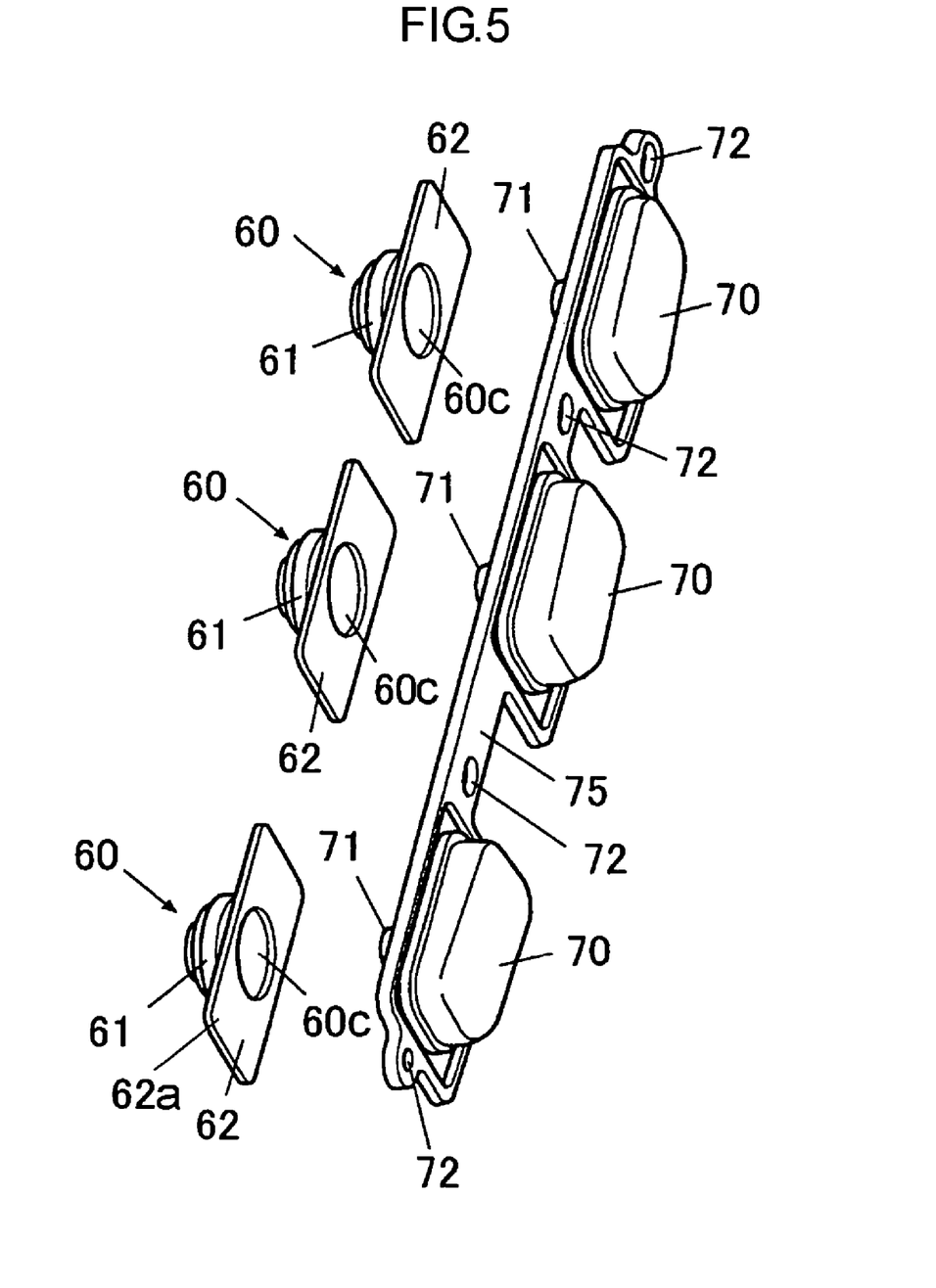
FIG. 5 is a perspective view illustrating the opposite sides of the push buttons, the rubber sheet, and the packing members in FIG. 4

As illustrated in the perspective views of FIGS. 4 and 5, the packing member 60 is an integral part which can be treated as a single part. That is, the packing member 60 can be molded by insert molding when the cylindrical holder 62 is made from metal, and can be molded by insert molding or double molding when the cylindrical holder 62 is made of a hard resin. Of course, the cup member 61 and the cylindrical member 62 may be made separately, and a cylindrical portion 62c of the cylindrical holder 62 may be inserted into an aperture portion 61c of the cup member 61, so as to integrate them with each other.

A circular protrusion 61a is formed on the top head surface of the cup member 61, i.e., a surface opposite to the open end portion which covers the cylindrical holder 62.

A convex portion 61b is formed around the cylindrical outer circumference surface of the cup member 61, i.e., the entire outer circumference surface of an area which covers the outer circumference surface of the cylindrical holder 62. The outer diameter of the convex portion 61b of the cup member 61 is set in such a way as to be slightly larger than the inner diameter of the through hole 52 in a normal condition where the cup member 61 is not inserted into the through hole 52.

The cylindrical portion 62c of the cylindrical holder 62 is fitted in the aperture portion 61c of the cup member 61. An opening 60c of the packing member 60 is constituted by the aperture portion 61c and the cylindrical portion 62c.

With the protrusion 61a of the cup member 61 in the lead of insertion, the packing member 60 is inserted into the through hole 52 from outside the inner casing 31, and is pushed therein until the flange portion 62a of the cylindrical holder 62 is caught by the bottom of the recess portion 51 around the through hole 52.

In this state, the protrusion 61a of the cup member 61 becomes in a state where it slightly contacts the dome switch 39 or locates adjacent to the dome switch 39 as illustrated in FIG. 3, and the convex portion 61b of the cup member 61 is compressed and deformed between the outer circumference surface of the cylindrical holder 62 and the inner wall of the through hole 52. Accordingly, the packing member 60 is held within the through hole 52, and water leakage between a wall surface of the through hole 52 and the outer circumference surface of the cup member 61 is prevented.

The three push buttons 70 are integrated by a piece of rubber sheet 75 as illustrated in the perspective views of FIGS. 4 and 5. A protrusive portion 71 is protrudingly formed on the bottom surface of the push button 70. The protrusive portion 71 of the push button 70 passes through the rubber sheet 75, and the bottom surface of the push button 70 is adhered to the rubber sheet 75. In this manner, the three push buttons 70 are fixed to the rubber sheet 75 at predetermined intervals.

Both ends of the rubber sheet 75 and portions thereof between the fixed push buttons 70 are formed with insertion holes 72. When the lower housing 3 is assembled, tiny protrusions 54 formed near the recess portions 51 formed on the right side face (in FIG. 2) of the inner casing 31 are inserted into the insertion holes 72 of the rubber sheet 75, so that the push buttons 70 can be temporally fixed to the inner casing 31.

Respective protrusive portions 71 of the three push buttons 70 are inserted into the openings 60c of the packing members 60 with the rubber sheet 75 externally covering the flange portions 62a of the three packing members 60, and as illustrated in FIG. 3, the leading end of the protrusive portion 71 contacts a bottom surface 61d of the aperture portion 61c of the cup member 61.

As illustrated in FIG. 2, three notches 32a are formed on the edge portion of the right side face of the top cover 32, and three notches 33a are formed on the edge portion of the right side face of the back cover 33. The notch 32a and the notch 33a are formed at a position corresponding to the recess portion 51. As the top cover 32 and the back cover 33 are laid over against each other with the inner casing 31 sandwiched, openings each constituted by the notch 32a and the notch 33a are formed in the joint line of the top cover 32 and the back cover 33.

That is, openings constituted by the notches 32a and the notches 33a are formed in such a way as to oppose the recess portions 51. The push button 70 is exposed from the opening constituted by the notch 32a and the notch 33a. The rubber sheet 75 is sandwiched between the right side face of the inner casing 31 and the right side faces of the top cover 32 and the back cover 33, so that the notch 32a and the notch 33a prevent the push button 70 from coming out. By screwing screws 81 in the top cover 32 through the inner casing 31 from the back cover 33, the inner casing 31, the top cover 32 and the back cover 33 are fixed.

The assembling procedures of the lower housing 3 are as follows.

First of all, the circuit board and the key FPC 36 are housed in the housing recess portion 34 of the inner casing 31, and the housing recess portion 34 is covered by the key sheet member 37. At the time of housing the key FPC 36, the vented portion 36a of the key FPC 36 is inserted between the rib 53 and a right inner surface 34a of the housing recess portion 34.

Next, with the protrusion 61a of the cup member 61 in the lead of insertion, the packing member 60 is fitted into the through hole 52 from outside the inner casing 31. When the packing member 60 is fitted into the through hole 52, the packing member 60 is pushed in the through hole 52 until the flange portion 62a of the packing member 60 is caught by the bottom of the recess portion 51. Accordingly, the measurement that the packing member 60 is pushed in the through hole 52 becomes a designed value, so that the packing member 60 is held at an appropriate position in the through hole 52. To be more precise, a distance between the protrusion 61a provided on the leading end of the packing member 60 and the surface of the rib 53 supporting the vented portion 36a of the key FPC 36 becomes a designed value, so that the protrusion 61a of the cup member 61 comes to slightly contact or locate adjacent to the dome switch 39 provided on the vented portion 36a of the key FPC 36. At this time, the rear surface of the vented portion 36a of the key FPC 36 slightly contacts the surface of the rib 53.

Next, the protrusive portion 71 of the push button 70 is inserted into the opening 60c of the packing member 60, and the packing member 60 is covered by the rubber sheet 75, and the protrusions 54 formed near the recess portions 51 on the side face of the inner casing 31 are inserted into the insertion holes 72 formed on the rubber sheet 75. This temporary fixes the push button 70 to the side face of the inner casing 31.

Subsequently, the inner casing 31 is sandwiched between the top cover 32 and the back cover 33, and the top and back covers 32, 33 are laid over against each other. That is, the rubber sheet 75 is upwardly and downwardly sandwiched between the edge of the top cover 32 and the edge of the back cover 33 in such a way that the push bottom 70 is exposed from the opening constituted by the notch 32a and the notch 33a.

Finally, the screws 81 are inserted from the back cover 33, and screwed in the top cover 32 through the inner casing 31.

A work of covering the recess portion 34 by the key sheet member 37 has been explained as to be carried out right after the circuit board and the key FPC 36 are housed in the housing recess portion 34 of the inner casing 31, but it may be carried out at any time until the inner casing 31 is covered by the top cover 32 after the circuit board and the key FPC 36 are housed in the housing recess portion 34.

In the aforementioned waterproof structure, when a user pushes a push button 70 with the user's finger, the rubber sheet 75 is elastically deformed, and the push button 70 is moves toward the inner casing 31 side. Accordingly, the central portion of the bottom surface 61d of the cup member 61 is pressed by the protrusive portion 71 of the push button 70. At this time, the circumference of the bottom surface 61d of the cup member 60 is elastically deformed, and the central portion of the bottom surface 61d is pushed in the interior of the inner casing 31, and the dome switch 39 is pushed by the protrusion 61a provided on the central portion of the rear face side of the bottom surface 61d. In this manner, as the dome switch 39 is pressed by elastic deformation of the cup member 61 (to be more precise, elastic deformation of the circumference of the bottom surface 61d of the cup member 61), when the user pushes the push button 70 with the user's finger, the packing member 60 does not come out from the through hole 52, and is not misaligned in the through hole 52.

In contrast, when the user put the finger away from the push button 70, the push button 70 returns to an original position by the elastic forces of the cup member 61 and the rubber sheet 75.

According to the embodiment, a simple structure that the packing member 60 constituted by fitting the cylindrical portion 62c of the cylindrical holder 62 in the aperture portion 61c of the rubber elastic material made cup member 61 is fitted into the through hole 52 can enhance the watertightness of the through hole 52. In particular, according to the embodiment, because the convex portion 61b is formed around the outer circumference surface of the cup member 61, waterproofing property is very high. As the flange portion 62a is formed on the cylindrical holder 62 fitted in the aperture portion 61c of the cup member 61, and the packing member 60 is pushed in the through hole 52 until the flange portion 62a is caught by the bottom of the recess portion 51, a work of fitting the packing member 60 into the through hole 52 when the packing member 60 is fitted in the through hole 52 can be easily carried out with good accuracy.

As the push button 70 is temporary fixed by the insertion holes 72 formed in the rubber sheet 75 which couples the three buttons 70 and the protrusions 54 formed near the recess portions 51 of the side face of the inner casing 31, it is possible to easily assemble the push button 70. Because the dome switch 39 is provided in the inner casing 31, a conventional work such as pulling wirings into the casing from the exterior of the casing is not required, and this improves the workability of assembling.

Because waterproofing of the through hole 52 is accomplished by compressing and deforming the convex portion 61b of the cup member 61 between the outer circumference surface of the cylindrical portion 62c of the cylindrical holder 62 and the inner wall of the through hole 52, it is not necessary to mount a waterproof member on the outer side face of the casing as conventional. Therefore, the thickness of the side face portion (right side face in FIGS. 1 and 2) of the lower housing 3 provided with the push buttons can be thin.

The present invention is not limited to the aforementioned embodiment, and various modification and changes in design can be possible within the scope of the present invention.

For example, in the embodiment, a structure that the cylindrical holder 62 is provided with the flange portion 62*a* is employed, but a structure that the flange portion 62*a* is provided on the cup member 61 instead of the cylindrical holder 62 may be employed. The flange portion 62*a* may not be provided at all. The waterproof of the through hole 52 is possible if the cup member 61 is compressed and deformed between the outer circumference surface of the cylindrical portion 62*c* of the cylindrical holder 62 and the inner wall of the through hole 52, so that the convex portion 61*b* may be omitted if the thickness of an area of the cup member 61 located at the outer circumference surface of the cylindrical holder 62 is so thick as to be capable of sufficient compression and deformation. The cup member 61 does not need cover all of the outer circumference surface of the cylindrical holder 62. For example, the cup member 61 may be structured in such a manner as to cover the cylindrical holder 62 from one open end to an area of the outer circumference surface which at least overlaps the through hole 52. A structure that the cup member 61 covers one open end of the cylindrical holder 62 and a material elastic as same as the cup member 61 covers a pat of an area overlapping the through hole 52 in the outer circumference surface of the cylindrical holder 62 may be employed. The point is, that the packing member 60 comprises the cylindrical holder 62 and an elastic member which covers one open end of the cylindrical holder 62 and at least a part of an area overlapping the through hole 52 in the outer circumference surface of the cylindrical holder 62, and they are structured as integrated parts which can be handled as a single part.

In the embodiment, a structure that the protrusion 61*a* for pressing the dome switch 39 is provided at the center of the rear surface side of the bottom surface 61*d* of the cup member 61 is employed, but the protrusion 61*a* may be omitted. As the central portion of the bottom surface 61*d* is pushed in the inner casing 31 when the bottom surface 61*d* of the cup member 61 is pushed by the protrusive portion 71 of the push button 70, it is possible to push the dome switch 39 by the bottom surface 61*d* of the cup member 61 without the protrusion 61*a*.

In the embodiment, a structure that the rib 53 provided at the bottom of the housing recess portion 34 in a standing manner supports the back face side of the vented portion 36*a* of the key FPC 36 provided with the dome switch 39 is employed, but other members may support the back face side of the vented portion 36*a* of the key FPC 36. For example, in a case where the circuit board is covered by a shield casing, the side face of the shield casing may support the vented portion 36*a*.

Although the explanation has been given of a case where the cellular phone 1 is taken as an example of an electronic device, the invention may be applied to side faces of a laptop computer, a digital camera, a wrist watch, a PDA (Personal Digital Assistance), an electronic organizer, a portable radio, and other electronic devices.

This application claims a priority based on Japanese Patent Application No. 2005-170168 filed on Jun. 9, 2005, and all of the disclosures of the basic application are hereinafter incorporated in this application.

What is claimed is:

1. A waterproof structure of a push button switch comprising:
   a casing inside which a press type switch is provided, and which is formed with a through hole at a position opposite said press type switch;
   a packing which includes an elastic member inserted into said through hole and having a cup member with a bottom and an aperture portion oriented toward the outside of said casing, and a cylindrical holder having a cylindrical portion that fits into said aperture portion; and
   a push button having a protrusive portion inserted into said aperture portion of said elastic member, and arranged to close said press type switch via said elastic member by engaging the bottom of said cup member which intervenes between said push button and said press type switch.

2. The waterproof structure of a push button switch according to claim 1, wherein said elastic member covers an open end of said cylindrical holder on said elastic member side of said cylindrical holder and extends to a region on an outer circumferential surface of said cylindrical holder that overlaps with at least said through hole.

3. The waterproof structure of a push button switch according to claim 1, wherein said elastic member has a convex portion which is formed around an entire outer circumference surface of said elastic member, and which is compressed and deformed by fitting said elastic member into said through hole.

4. The waterproof structure of a push button switch according to claim 1, wherein said elastic member has a flange portion which is stopped by an outer surface of said casing.

5. The waterproof structure of a push button switch according to claim 1, wherein said cylindrical holder has a flange portion which is stopped by an outer surface of said casing.

6. The waterproof structure of a push button switch according to claim 5, wherein said casing has a recess portion formed around said through hole, and said flange portion of said cylindrical holder is fitted into said recess portion.

7. The waterproof structure of a push button switch according to claim 1, further comprising:
   a pair of covers covering said casing and each having a notch portion; and
   a piece of elastic sheet provided with said push button,
   wherein said elastic sheet is sandwiched between said casing and said pair of covers in such a way that said push button is exposed from said notch portions.

8. A waterproof structure of a push button switch comprising:
   a casing inside which a press type switch is provided, and which is formed with a through hole at a position opposite said press type switch;
   a packing which includes an elastic member inserted into said through hole in such a way that an aperture portion of said elastic member is oriented to the outside of said casing, and a cylindrical holder having a cylindrical portion that fits into said aperture portion; and
   a push button having a protrusive portion inserted into said aperture portion of said elastic member, and which can press said press type switch via said elastic member;
   wherein said elastic member covers an open end of said cylindrical holder on said elastic member side of said cylindrical holder and extends to a region on an outer circumferential surface of said cylindrical holder that overlaps with at least said through hole.

9. A waterproof structure of a push button switch comprising:
   a casing inside which a press type switch is provided, and which is formed with a through hole at a position opposite said press type switch;

a packing which includes an elastic member inserted into said through hole in such a way that an aperture portion of said elastic member is oriented to the outside of said casing, and a cylindrical holder having a cylindrical portion that fits into said aperture portion; and a push button having a protrusive portion inserted into said aperture portion of said elastic member, and which can press said press type switch via said elastic member;

a pair of covers covering said casing and each having a notch portion; and a piece of elastic sheet provided with said push button, wherein said elastic sheet is sandwiched between said casing and said pair of covers in such a way that said push button is exposed from said notch portions.

* * * * *